United States Patent [19]

Böhringer et al.

[11] Patent Number: 5,565,522
[45] Date of Patent: Oct. 15, 1996

[54] POLYESTER FIBER AND PROCESS FOR THE PRODUCTION THEREOF

[75] Inventors: Bertram Böhringer, Wuppertal; Diederich Schilo, Klingenberg, both of Germany

[73] Assignee: Akzo Nobel N.V., Arnhem, Netherlands

[21] Appl. No.: 302,737

[22] PCT Filed: Mar. 16, 1993

[86] PCT No.: PCT/EP93/00609

§ 371 Date: Sep. 9, 1994

§ 102(e) Date: Sep. 9, 1994

[87] PCT Pub. No.: WO93/19231

PCT Pub. Date: Sep. 30, 1993

[30] Foreign Application Priority Data

Mar. 20, 1992 [DE] Germany ............... 42 08 916.6

[51] Int. Cl.⁶ ................................................ C08L 67/02
[52] U.S. Cl. ........................... 525/176; 525/175; 264/211
[58] Field of Search .......................... 525/176, 175; 264/211

[56] References Cited

U.S. PATENT DOCUMENTS

| | | | |
|---|---|---|---|
| 4,246,374 | 1/1981 | Kopchik | 525/329 |
| 4,609,710 | 9/1986 | Iohara | 525/176 |
| 5,004,777 | 4/1991 | Hallden-Abberton | 525/175 |

FOREIGN PATENT DOCUMENTS

| | | |
|---|---|---|
| 385280 | 3/1988 | Austria. |
| 0047464 | 3/1982 | European Pat. Off.. |
| 0049412 | 4/1982 | European Pat. Off.. |
| 0216505 | 4/1987 | European Pat. Off.. |
| 0352624 | 1/1990 | European Pat. Off.. |
| 0376749 | 7/1990 | European Pat. Off.. |
| 1165861 | 3/1964 | Germany. |
| 2013997 | 10/1971 | Germany. |
| 2134140 | 1/1972 | Germany. |
| 2925006 | 1/1981 | Germany. |
| 3125254 | 6/1982 | Germany. |
| 3506635 | 9/1987 | Germany. |
| 3930845 | 3/1991 | Germany. |
| 4026957 | 2/1992 | Germany. |
| 4129521 | 3/1993 | Germany. |
| 2101139 | 1/1983 | United Kingdom. |

OTHER PUBLICATIONS

Patents Abstracts of Japan, C-477 Feb. 19, 1988, vol. 12, No. 56.

*Primary Examiner*—Patricia A. Short
*Attorney, Agent, or Firm*—Oliff & Berridge

[57] ABSTRACT

A fiber predominantly composed of polyethylene terephthalate as fiber polymer, which contains 0.1 to 5% by weight, based on the fiber polymer, of a polyalkyl methacrylate, imidated up to 50 to 90%, predominantly in the form of inclusions. Also provided is a process for the production of melt-spun fibers, essentially composed of polyethylene terephthalate, by melting the fiber polymer and subsequent melt spinning, characterized in that the fiber polymer receives an admixture of 0.1 to 5% by weight, based on the fiber polymer, of a polymer only partially soluble in this and essentially composed of imidated polyalkyl methacrylates which are imidated up to 50 to 90% by reaction of polyalkyl methacrylates, the ester group of which contains an alcohol having 1 to 6 C atoms, with a primary amine having 1 to 3 C atoms, and the acid and/or anhydride content of which is less than 0.25 milliequivalents per gram and, possibly, other additives prior to the melt spinning.

11 Claims, No Drawings

POLYESTER FIBER AND PROCESS FOR THE PRODUCTION THEREOF

FIELD OF THE INVENTION

The invention relates to a polyester fiber which contains other additives in small amounts and a process for the production thereof. Polyester fibers according to the invention are taken to mean both endless filaments and finite fibers, such as for example, staple fibers.

BACKGROUND

It is known to spin polymer mixtures of polyesters and small amounts of a second polymer at high speeds between 1500 and 8000 m/min to form polyester yarns. Defined mixture polymers for this are described for polyester in EP 0 047 464. In addition to a series of acrylic polymers, polymethyl methacrylate is recommended there in particular as a polymeric reagent for polyethylene glycol terephthalate (i.e. polyethylene terephthalate or PET). However, when it is used, thread breaks have been reported at least at a spinning speed of 7500 m/min (cf. ibid example 3).

SUMMARY OF THE INVENTION

The object of the present invention is to provide a further fiber made essentially of polyethylene terephthalate and other additives. It is also the object of the present invention to provide a process for the production of this fiber.

The object of the invention is achieved by a fiber predominantly composed of polyethylene terephthalate as fiber polymer, which is characterized in that it contains 0.5 to 5% by weight, based on the fiber polymer, to 50 to 90% of imidated polyalkyl methacrylate, predominantly in the form of inclusions. These fibers surprisingly have a higher initial modulus in the final drawn state than is the case with the addition of acrylic polymers, including polymethyl methacrylate. The final drawn state of yarns is reached in all cases when the yarns exhibit the low breaking extensions required for their application. These breaking extensions are normally about 35% for textile yarns, whereas, for industrial yarns, breaking extensions of preferably less than 15% are sought.

The fiber according to the invention is preferably characterized in that it contains 0.1 to 5% by weight, based on the fiber polymer, to 50 to 90% of imidated polymethyl methacrylate. It has particularly favorable properties if the fraction of the imidated polyalkyl methacrylate or polymethyl methacrylate is 0.3 to 1% by weight. The fiber polymer is preferably polyethylene glycol terephthalate.

The object of the invention is also achieved by a process for the production of melt-spun fibers essentially composed of polyethylene terephthalate, by melting the fiber polymer and subsequent melt spinning, which is characterized in that the fiber polymer receives an admixture of 0.1 to 5% by weight, based on the fiber polymer, of a polymer only partially soluble in this and essentially composed of imidated polyalkyl methacrylates which are imidated up to 50 to 90% by reaction of polyalkyl methacrylates, the ester group of which contains an alcohol having 1 to 6 C atoms, with a primary amine having 1 to 3 C atoms, and the acid and/or anhydride content of which is less than 0.25 milliequivalents per gram and, possibly, other additives prior to the melt spinning.

DESCRIPTION OF PREFERRED EMBODIMENTS

Surprisingly, it has been found that polymer mixtures of polyesters and small amounts of another type of polymer narrowly restricted in terms of constitution can be spun at the high spinning speed mentioned and higher without problems with conventional thread break numbers. Even at spinning speeds as high as for example 8000 m/min, the melt-spin process according to the invention gives the very low thread break numbers conventional for polyester spinning.

The fiber polymers suitable are all high-melting fiber-forming polyesters, in particular those which are predominantly, that is at least up to 80%, composed of ethylene glycol terephthalate units. The remaining dicarboxylic acid and diol components of these (co)polyesters can be the co-components conventional in the production of drawn polyester forms, such as, for example, isophthalic acid, p,p'-biphenyldicarboxylic acid, all possible naphthalenedicarboxylic acids, hexahydroterephthalic acid, adipic acid, sebacic acid and glycols, such as trimethylene glycol, tetramethylene glycol, hexamethylene glycol and decamethylene glycol, etc. A highly preferred polyester is polyethylene glycol terephthalate.

The preferred polyesters are to have a viscosity as high as possible, that is at least a solution viscosity of greater than 1.5, measured in 1% strength m-cresol solution at 20° C. The high viscosity values sought can be achieved with the aid of known processes, such as, for example, condensation in the melt, an additional post-condensation in the melt with or without using condensation accelerators or postcondensation in the solid state.

Suitable polymeric reagents for the fiber polymer essentially composed of polyethylene terephthalate are defined polymers, only partially soluble in the fiber polymer, composed of essentially imidated polyalkyl methacrylates, which are imidated up to 50 to 90% by reaction of polyalkyl methacrylates, the ester group of which contains an alcohol having 1–6 C atoms, with a primary amine having 1–3 C atoms and preferably with methylamine and the acid and/or anhydride content of which is less than 0.25 milliequivalents per g. Their level of addition can be 0.1 to 5% by weight, based on the fiber polymer, the higher weight percentages applying to very high molecular polyethylene glycol terephthalates, since under some circumstances they can already lead to thread breaks at the conventional molecular weights. However, an addition of only 0.3 to 1.0 percent by weight of the imidated polyalkyl methacrylate, based on the fiber polymer, is preferred which is generally already sufficient.

The imidated polyalkyl methacrylates can contain up to 10 mole per cent of other monomer units, for example monounsaturated or polyunsaturated monomers, such as styrene, acrylonitrile and butadiene. However, imidated polyalkyl methacrylates are preferred which have been obtained by imidation of the pure methacrylic homopolymers, in particular of the pure polymethyl methacrylate, with methylamine and have the above-mentioned degree of imidation and acid and/or anhydride content. The degree of imidation of the imidated polyalkyl methacrylates should be selected to be higher, the higher the viscosity of the polyethylene terephthalate used. The molecular weight of the reagent, in contrast, is not critical within very wide limits. A molecular weight range of 50,000 to 300,000 is generally preferred. In particular, the commercially available types sold by the Rohm and Haas Company Paraloid® EXL 4241, Paraloid® EXL 4240, Paraloid® EXL 4261 and Paraloid®

EXL 4260 are preferred. It is surprising that these substances as additives to the fiber polymers increase the breaking extension in comparison to the pure fiber polymers, in particular since these substances as fiber polymers exhibit, after the melt spinning, very low break extensions, generally below 10%. The polymeric additives can be homogeneously incorporated into the polyesters either as each individual substance or as a mixture of substances, for example, by means of an extruder.

The preparation of imidated polyalkyl methacrylates is known (U.S. Pat. No. 4,246,374, GB Patent 21 01 139, EP 0 216 505). In EP 0 216 505 in Table XVIII on page 65, polymer blends are also described from imidated polymethyl methacrylate and polyethylene glycol terephthalate in a weight ratio of 90/10 to 10/90, which as a consequence of the addition action known per se effect a conventional modification of a multiplicity of physical properties of each of the thermoplastic main polymers.

However, the use according to the invention and suitability of the imidated polyalkyl methacrylates for a process for the production of polyester filament yarns by high-speed spinning and very high-speed spinning at delivery speeds of 500 to 10,000 m/min and above are not known. The fact that the procedure can preferably even be carried out in this case generally with levels of addition of below 1 per cent by weight and that when such a procedure is used, furthermore, in the final drawn yarns, an increase of the initial modulus of the polyester filament yarns can surprisingly be achieved, could not be deduced from the prior art.

The admixture of the additives to the polyethylene terephthalate is expediently carried out prior to the extruder, where the fiber polymer and the additives should be present in granular form. The extruder in this case, when the granules are melted, ensures an even distribution of the additives in the fiber polymer. Other static and/or dynamic mixers can be provided in the melt line and/or directly prior to the spin pack.

However, the admixture can also be carried out in such a manner that the melt of fiber polymer is mixed with the melt of the additives via static and/or dynamic mixers.

To produce the fibers according to the invention, virtually all known spinning processes are suitable, but where a pronounced retarded cooling zone directly below the spinneret should be avoided. A short tube subsequent to the spinneret keeping the cooling air from the spinneret favors the melt spinning process. A length of this tube of a few cm has proved to be optimal. The fibers according to the invention can be produced without problem at virtually all technically possible take-up speeds, in particular at take-up speeds from 500 to 10,000 m/min.

It is a merit of the present invention that using the process according to the invention can produce partially oriented yarns at take-up speeds of up to 8,000 m/min, that is, yarns which have not yet been drawn to the breaking extension required for the particular application. These yarns are therefore best suited for further processing. Textile yarns, for example, can be easily produced to give textured yarns using the processes conventional for this. Industrial yarns are best suited for the production of tire cords.

Processes suitable as the melt spinning process are particularly those such as, for example, are described in DE Patent 29 25 006 or in the non-prior published German Patent Applications P 41 29 521.8, P 42 01 119.1 and P 42 07 095.

The invention is described in more detail on the basis of the following examples.

To produce textile yarns, the fiber polymer used was a polyethylene terephthalate having a solution viscosity of 1.63, while the additive used was Paraloid® EXL 4241. The melt spinning process was carried out at various take-up speeds. To produce filament yarn at a take-up speed of 3,500 m/min, the freshly spun yarn was cooled via a conventional transverse air current, then passed over two godets or one godet and one grooved roll and then taken up. In a second step, these yarns were drawn. To produce filament yarns at take-up speeds of 6000, 7000 and 8000 m/min, an apparatus was used such as is described in the non-prior published German Patent Application P 41 29 521.8. The yarns spun at 6000 and 7000 m/min were drawn in a second step. The essential process parameters, the properties of the spun yarns and the properties of the drawn yarns are listed in Table 1. All trials proceeded faultlessly. The properties of the undrawn yarn show that as a result of the addition, even yarns spun at very high speed can be subjected to further processing conventional for textile fibers. In the drawn yarns, a marked increase of the modulus is indicated.

To produce industrial yarns, the fiber polymer used was a polyethylene terephthalate having a solution viscosity of 2.04, while the additive used was Paraloid® EXL 4240 or Paraloid® EXL 4260. Granules of the fiber polymer and of the additives were fed to the extruder in a dosed amount. Upstream of the spin pack, a dynamic mixer ensured thorough mixing of the melt. The melt spinning process was carried out at take-up speeds of 500, 2000 and 4000 m/min.

The freshly spun yarn was cooled using transverse air current, then passed over two godets and then taken up. In a second step, the yarns were drawn.

The essential process parameters are listed in Table 2 for yarn spun at 500 m/min, in Table 3 for yarn spun at 2000 m/min and in Table 4 for yarn spun at 4000 m/min. All trials proceeded faultlessly. The properties of the drawn yarns demonstrate the utility of these yarns for the production of tire cords.

TABLE 1

| | | | Trial No. | | | | | | |
|---|---|---|---|---|---|---|---|---|---|
| | | 1 PET | 2 PET + 0.5% EXL 4241 | 3 PET | 4 PET + 0.68% EXL 4241 | 5 PET | 6 PET + 0.64% EXL 4241 | 7 PET | 8 PET + 0.7% EXL 4241 |
| Spinning Conditions | | | | | | | | | |
| Spinneret hole diameter | μm | 250 | 250 | 200 | 200 | 200 | 200 | 250 | 250 |

TABLE 1-continued

|  |  | Trial No. | | | | | | | |
|---|---|---|---|---|---|---|---|---|---|
|  |  | 1<br>PET | 2<br>PET + 0.5%<br>EXL 4241 | 3<br>PET | 4<br>PET + 0.68%<br>EXL 4241 | 5<br>PET | 6<br>PET + 0.64%<br>EXL 4241 | 7<br>PET | 8<br>PET + 0.7%<br>EXL 4241 |
| Number of holes |  | 24 | 24 | 36 | 36 | 36 | 36 | 24 | 24 |
| Speed | m/min | 3609 |  |  |  |  |  |  |  |
| 1st Godet | m/min | 3748 | 3642 | — | — | — | — | — | — |
| Grooved roll | m/min | 3506 | 3748 | — | — | — | — | — | — |
| Take-up |  |  | 3506 | 6000 | 6000 | 7000 | 7000 | 8000 | 8000 |
| Undrawn yarn |  |  |  |  |  |  |  |  |  |
| Linear density | dtex | 144.2 | 145.0 | 89.2 | 98.1 | 76.1 | 89.8 | 76.0 | 76.3 |
| Breaking extension | % | 113.2 | 184.5 | 47.5 | 65.3 | 36.8 | 52.5 | 26.8 | 36.0 |
| Strength | cN/tex | 27.2 | 19.2 | 36.1 | 30.8 | 35.4 | 33.5 | 32.1 | 35.0 |
| Shrinkage on boiling | % | 67.4 | 62.4 | 3.0 | 6.5 | 2.6 | 4.0 | 2.7 | 2.7 |
| Hot air shrinkage (190° C.) | % | — | — | 3.9 | 6.1 | 3.3 | 4.7 | 3.4 | 3.5 |
| Birefringence |  | 0.05450 | .0299 | 0.1168 | 0.0900 | 0.1134 | 0.1066 | 0.1028 | 0.0895 |
| Drawing | 1: | 1.53 | 1.86 | 1.15 | 1.32 | 1.7 | 1.21 | — | — |
| Drawn yarn |  |  |  |  |  |  |  |  |  |
| Linear density | dtex | 94.5 | 78.2 | 72.8 | 75.3 | 71.4 | 74.7 | — | — |
| Breaking extension | % | 36.8 | 37.8 | 31.8 | 30.6 | 28.1 | 26.6 | — | — |
| Strength | cN/tex | 42.4 | 39.0 | 39.4 | 37.5 | 35.7 | 39.4 | — | — |
| Modulus (1–2%) | cN/tex | 585.7 | 613.8 | 735.2 | 735.4 | 684.6 | 732.2 | — | — |
| Modulus (at 2%) | cN | — | — | — | — | 120.0 | 139.9 | — | — |

TABLE 2

|  |  | Trial No. | | | |
|---|---|---|---|---|---|
|  |  | 9 | 10 | 11 | 12 |
|  |  |  | Additive | | |
|  |  | PET | PET + 0.5%<br>EXL 4240 | PET + 1.5%<br>EXL 4240 | PET + 3.0%<br>EXL 4240 |
| Spinning conditions |  |  |  |  |  |
| Spinneret hole diameter | μm | 350 | 350 | 350 | 350 |
| Number of holes |  | 12 | 12 | 12 | 12 |
| Speed |  |  |  |  |  |
| 1st godet | m/min | 510 | 510 | 510 | 510 |
| Grooved roll | m/min | 510 | 510 | 510 | 510 |
| Take-up | m/min | 500 | 500 | 500 | 500 |
| Undrawn yarn |  |  |  |  |  |
| Linear density | d/tex | 317.7 | 323.9 | 323.9 | 324.5 |
| Breaking extension | % | 386.2 | 440.5 | 444.1 | 463.5 |
| Strength | cN/tex | 11.0 | 9.3 | 10.6 | 10.1 |
| Shrinkage on boiling | % | 47.1 | 34.0 | 35.1 | 26.9 |
| Birefringence |  | 0.0039 | 0.0020 | 0.0025 | 0.0020 |
| Drawing | 1: | 5.05 | 5.00 | 5.00 | 5.10 |
| Drawn yarn |  |  |  |  |  |
| Linear density | dtex | 66.0 | 67.5 | 69.0 | 66.5 |
| Breaking extension | % | 8.5 | 12.4 | 14.5 | 13.0 |
| Strength | cN/tex | 68.7 | 57.6 | 57.7 | 54.8 |
| Hot air shrinkage at 190° C. | % | 8.4 | 8.7 | 8.3 | 8.7 |
| E-Modulus (1–2%) | cN/tex | 1165.5 | 823.0 | 905.8 | 835.4 |

TABLE 3

| | | Trial No. | | | | |
|---|---|---|---|---|---|---|
| | | 13 | 14 | 15 | 16 | 17 |
| | | | | Additive | | |
| | | PET | PET + 0.5% EXL 4240 | PET + 1.0% EXL 4240 | PET + 1.0% EXL 4240 | PET + 3.0% EXL 4240 |
| Spinning conditions | | | | | | |
| Spinneret hole diameter | μm | 350 | 350 | 350 | 350 | 350 |
| Number of holes | | 12 | 12 | 12 | 12 | 12 |
| Speed | | | | | | |
| 1st godet | m/min | 2050 | 2048 | 2053 | 2042 | 2042 |
| Grooved roll | m/min | 2205 | 2192 | 2209 | 2199 | 2209 |
| Take-up | m/min | 2010 | 2006 | 2008 | 2006 | 2008 |
| Undrawn yarn | | | | | | |
| Linear density | d/tex | 163.4 | 173.5 | 172.0 | 176.0 | 167.4 |
| Breaking extension | % | 190.4 | 237.6 | 214.7 | 244.3 | 244.0 |
| Strength | cN/tex | 19.0 | 16.5 | 17.8 | 14.9 | 15.1 |
| Shrinkage on boiling | % | 66.4 | 62.7 | 64.5 | 58.6 | 58.4 |
| Birefringence | | 0.0228 | 0.0152 | 0.0174 | 0.0123 | 0.0127 |
| Drawing | 1: | 2.75 | 3.2 | 2.6 | 3.2 | 3.2 |
| Drawn yarn | | | | | | |
| Linear density | dtex | 60.0 | 60.5 | 57.0 | 58.0 | 56.0 |
| Breaking extension | % | 7.4 | 10.9 | 7.7 | 11.8 | 11.8 |
| Strength | cN/tex | 67.4 | 60.7 | 74.4 | 58.3 | 58.6 |
| Hot air shrinkage at 190° C. | % | 6.6 | 6.1 | 5.7 | 6.4 | 6.2 |
| E-modulus (1–2%) | cN/tex | 1356.2 | 1180.6 | 1253.1 | 957.9 | 1116.1 |

TABLE 4

| | | Trial No. | | | | |
|---|---|---|---|---|---|---|
| | | 18 | 19 | 20 | 21 | 22 |
| | | | | Additive | | |
| | | PET | PET + 0.5% EXL 4240 | PET + 1.0% EXL 4240 | PET + 1.0% EXL 4240 | PET + 3.0% EXL 4240 |
| Spinning conditions | | | | | | |
| Spinneret hole diameter | μm | 350 | 350 | 350 | 350 | 350 |
| Number of holes | | 12 | 12 | 12 | 12 | 12 |
| Speed | | | | | | |
| 1st godet | m/min | 4072 | 4088 | 4105 | 4105 | 4070 |
| Grooved roll | m/min | 4360 | 4401 | 4401 | 4401 | 4401 |
| Take-up | m/min | 3989 | 4000 | 4000 | 4000 | 4000 |
| Undrawn yarn | | | | | | |
| Linear density | d/tex | 110.4 | 115.8 | 111.0 | 111.03 | 112.6 |
| Breaking extension | % | 94.7 | 103.9 | 107.0 | 148.5 | 204.0 |
| Strength | cN/tex | 30.1 | 27.3 | 25.2 | 20.6 | 16.8 |
| Shrinkage on boiling | % | 4.4 | 7.3 | 8.2 | 26.0 | 37.0 |
| Birefringence | | 0.0797 | 0.0654 | 0.0602 | 0.0335 | 0.0180 |
| Drawing | 1: | 1.75 | 1.85 | 1.80 | 2.20 | 2.80 |
| Drawn yarn | | | | | | |
| Linear density | dtex | 65.0 | 59.0 | 64.0 | 53.0 | 43.0 |
| Breaking extension | % | 10.2 | 8.4 | 11.8 | 11.1 | 10.7 |
| Strength | cN/tex | 60.2 | 64.2 | 50.7 | 55.1 | 57.5 |
| Hot air shrinkage at 190° C. | % | 5.1 | 5.1 | 5.0 | 5.2 | 5.5 |
| E-Modulus (1–2%) | cN/tex | 1098.9 | 1210.7 | 868.1 | 1109.9 | 1082.3 |

What is claimed is:

1. A fiber comprising polyethylene terephthalate as a main component, and 0.1 to 5% by weight, based on the main component, of a polyalkyl methacrylate that is from 50 to 90% imidated predominantly in the form of inclusions.

2. A fiber according to claim 1, wherein the polyalkyl methacrylate is a polymethyl methacrylate.

3. A process for the production of melt-spun fibers comprising:

providing an admixture comprising polyethylene terephthalate as a main component, and 0.1 to 5% by weight, based on the main component, of a polymer only partially soluble in the main component and substantially comprised of imidated polyalkyl methacrylates imidated from 50 to 90% by reaction of polyalkyl methacrylates having an ester group comprising an alcohol having 1 to 6 carbon atoms, with a primary amine having 1 to 3 carbon atoms, and the imidated polyalkyl methacrylates each having a combined acid content and anhydride content less than 0.25 milliequivalents per gram;

melting the admixture; and melt spinning the melted admixture.

4. A process according to claim 3, wherein the admixture comprises 0.3 to 1.0% by weight, based on the main component, of the imidated polyalkyl methacrylates.

5. A process according to claim 3, wherein the imidated polyalkyl methacrylates are obtained by imidation of pure methacrylic homopolymers with methylamine.

6. A process according to claim 3, wherein the imidated polyalkyl methacrylates have a molecular weight of 50,000 to 300,000.

7. A process according to claim 3, wherein the providing step comprises admixing granules of the imidated polyalkyl methacrylates with a granule stream of polyethylene terephthalate upstream of an extruder.

8. A process according to claim 3, wherein the admixture is extruded as a melt through conventional spinnerets, solidified to form filaments and taken up at a speed of 500 to 10,000 m/min.

9. A process according to claim 3, wherein the imidated polyalkyl methacrylates are obtained by imidation of pure polymethyl methacrylate with methylamine.

10. A process for the production of melt-spun fibers comprising:

providing a polyethylene terephthalate as a main component;

providing 0.1 to 5% by weight, based on the main component, of a polymer only partially soluble in the main component and substantially comprised of imidated polyalkyl methacrylates, imidated from 50 to 90% by reaction of a primary amine having 1 to 3 carbon atoms with polyalkyl methacrylates having an ester group comprising a 1 to 6 carbon alcohol, each polyalkyl methacrylate having a combined acid content and anhydride content less than 0.25 milliequivalents per gram;

melting said main component to form a first melt;

melting said polymer to form a second melt;

feeding the first melt to an extruder or to melt lines between the extruder and a spinneret assigned to the second melt and, optionally, both melts are mixed.

11. A process according to claim 10, wherein partially oriented yarns are produced at filament take-up speeds of up to 8000 m/min.

* * * * *

UNITED STATES PATENT AND TRADEMARK OFFICE
CERTIFICATE OF CORRECTION

PATENT NO. : 5,565,522

DATED : October 15, 1996

INVENTOR(S) : Bertram Bohringer and Diederich Schilo

It is certified that error appears in the above-identified patent and that said Letters Patent is hereby corrected as shown below:

IN THE ABSTRACT:

Line 2, after "as" insert --a--.

IN THE SPECIFICATION:

Columns 5-6, Table 1 at Trial No. 5, row 11, change "1.7" to --1.07--;
Columns 5-6, Table 2 at Trial No. 10, row 14, change "57.6" to --57.8--.

Signed and Sealed this

Fourth Day of March, 1997

Attest:

BRUCE LEHMAN

*Attesting Officer*     *Commissioner of Patents and Trademarks*